(12) United States Patent
Naruoka et al.

(10) Patent No.: US 11,180,021 B2
(45) Date of Patent: Nov. 23, 2021

(54) VEHICLE

(71) Applicant: KAWASAKI JUKOGYO KABUSHIKI KAISHA, Kobe (JP)

(72) Inventors: Shouhei Naruoka, Akashi (JP); Masaya Sando, Akashi (JP); Yuu Shibuta, Nishi-ku (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/949,160

(22) Filed: Oct. 15, 2020

(65) Prior Publication Data

US 2021/0114452 A1 Apr. 22, 2021

(30) Foreign Application Priority Data

Oct. 18, 2019 (JP) .............................. JP2019-190768

(51) Int. Cl.

| | |
|---|---|
| *B60K 11/08* | (2006.01) |
| *B60K 11/06* | (2006.01) |
| *F02F 1/24* | (2006.01) |
| *B62J 41/00* | (2020.01) |
| *F01M 11/02* | (2006.01) |
| *F01P 3/18* | (2006.01) |
| *F02F 7/00* | (2006.01) |

(52) U.S. Cl.
CPC .............. *B60K 11/06* (2013.01); *B60K 11/08* (2013.01); *B62J 41/00* (2020.02); *F01M 11/02* (2013.01); *F01P 3/18* (2013.01); *F02F 1/24* (2013.01); *F02F 7/0021* (2013.01)

(58) Field of Classification Search
CPC .......... B60K 11/06; B60K 11/08; B62J 41/00; B62J 99/00; F01M 11/02; F01P 3/18; F02F 1/24; F02F 7/0021
See application file for complete search history.

(56) References Cited

U.S. PATENT DOCUMENTS

| | | | | |
|---|---|---|---|---|
| 2005/0224266 | A1* | 10/2005 | Konno | ...................... B62J 17/06 180/68.1 |
| 2008/0289893 | A1* | 11/2008 | Iwanaga | .......... F02M 35/10262 180/229 |
| 2012/0312609 | A1* | 12/2012 | Takewaka | ................ B62J 17/02 180/65.1 |
| 2013/0214553 | A1* | 8/2013 | Tsukui | ..................... B62J 17/06 296/78.1 |

FOREIGN PATENT DOCUMENTS

| | | |
|---|---|---|
| EP | 2 574 529 A2 | 4/2013 |
| JP | 2013-75585 | 4/2013 |

* cited by examiner

*Primary Examiner* — Jacob M Amick
(74) *Attorney, Agent, or Firm* — Fay Kaplun & Marcin, LLP

(57) ABSTRACT

A vehicle includes an engine unit, a radiator, a first passage, and a second passage which is provided below the cylinder head and to which lubricating liquid is supplied. The radiator is arranged in front of the engine unit. The first passage includes a first opening arranged in front of the radiator so as to face the radiator and is configured to guide first traveling wind from the first opening toward the radiator. The second passage includes a second opening arranged outside the first opening in the vehicle width while being partitioned from the first opening, and is configured to guide second traveling wind from the second opening toward the lower supplied member.

8 Claims, 7 Drawing Sheets

VEHICLE

PRIORITY CLAIM

The present application claims priority under 35 U.S.C. § 119 to Japanese Patent Application Serial No. 2019-190768 filed Oct. 18, 2019. The contents of this application are incorporated herein by reference in their entirety.

FIELD

The present invention relates to a vehicle including an engine.

BACKGROUND

Conventionally, a vehicle that uses traveling wind generated during traveling to cool an engine has been known. Japanese Patent Application Publication (KOKAI) No. 2013-75585 discloses a motorcycle that is a vehicle of this type.

In the motorcycle described in Japanese Patent Application Publication (KOKAI) No. 2013-75585, traveling wind flows through the inside of the inner shroud to the vicinity of a cylinder head to cool an engine of the motorcycle.

According to a cooling structure of Japanese Patent Application Publication (KOKAI) No. 2013-75585, there is a case where it is impossible to sufficiently cool the engine.

SUMMARY

According to one aspect of the invention, a vehicle includes an engine, a heat exchanger, a first passage, and second passage. The engine unit including a cylinder head, a cylinder block, and a lower supplied member. The lower supplied member is provided below the cylinder head. Circulating liquid is supplied to the lower supplied member. The heat exchanger is arranged in front of the engine unit so as to straddle a center of a vehicle body in a vehicle width direction. The heat exchanger is for cooling the cylinder head of the engine unit. The first passage includes a first opening arranged in front of the heat exchanger so as to face the heat exchanger, and is configured to guide a part of traveling wind from the first opening toward the heat exchanger. The second passage includes a second opening provided in a covering member arranged outside the first opening in the vehicle width to cover at least a part of a front part of the engine unit while being partitioned from the first opening. The second passage is configured to guide another part of traveling wind from the second opening toward the lower supplied member.

Thus, the traveling winds generated when the vehicle travels can be guided to each of the first passage 51 and the second passage 52. Therefore, apart from the traveling wind flowing through the first passage, the traveling wind flowing through the second passage can be guided toward the lower supplied member 25. Consequently, cooling of the lower supplied member 25 can be promoted. As a result, the temperature rise of the circulating liquid in the lower supplied member can be suppressed.

Accordingly, it is possible to provide the vehicle capable of suppressing the temperature rise of the lubricating liquid supplied to the lower supplied member provided below the cylinder head.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
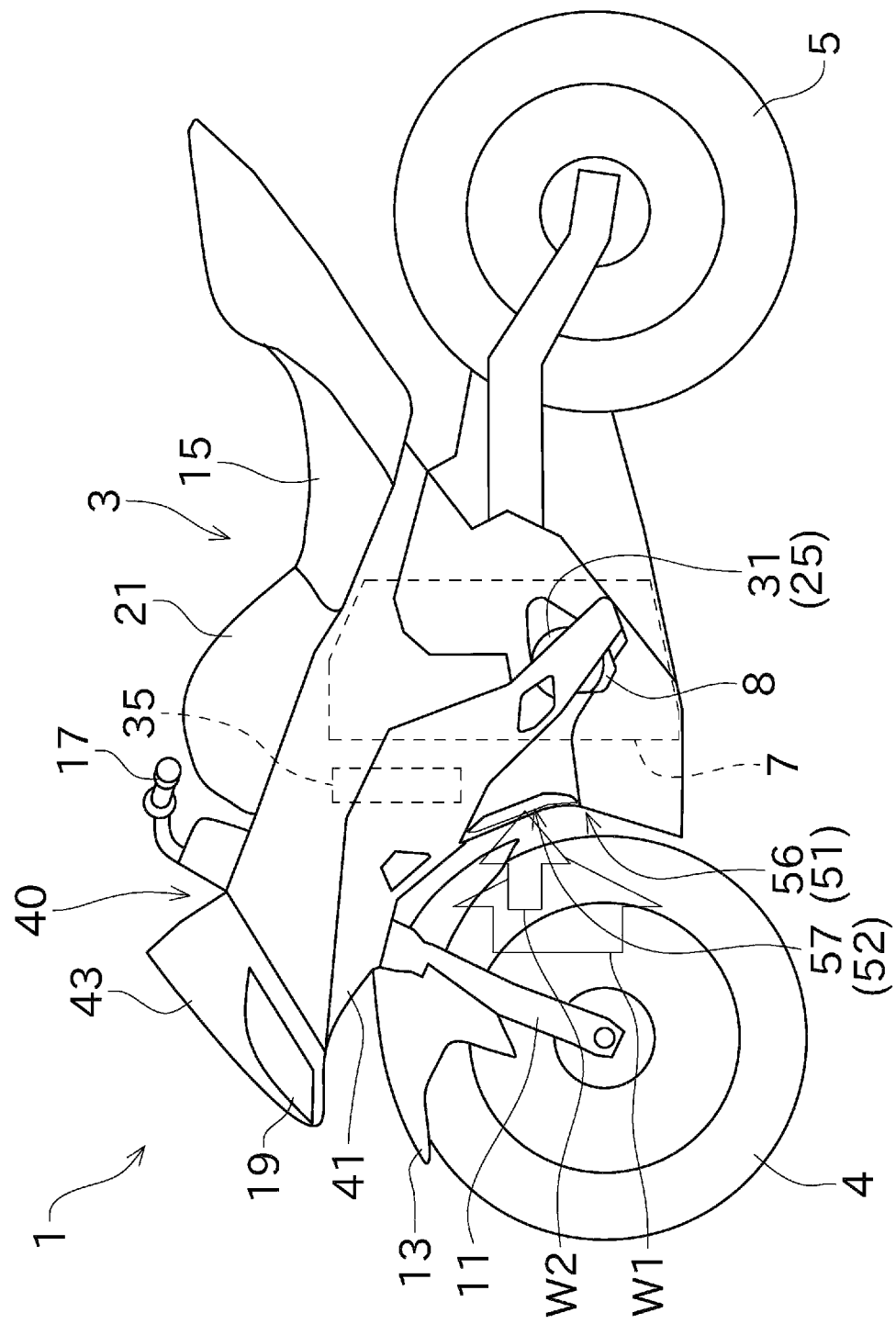
FIG. 1 is a side view showing each of configuration of a vehicle according to an embodiment of the present invention.

The embodiments will now be described with reference to the accompanying drawings, wherein like reference numerals designate corresponding or identical elements throughout the various drawings. Firstly, a vehicle 1 of this embodiment will be generally described with reference to FIG. 1. FIG. 1 is a side view showing t a general configuration of the vehicle 1.

The traveling vehicle 1 is a saddle type vehicle and is a motorcycle in this embodiment. A driver rides on the vehicle 1 while straddling the vehicle body 3 to drive the vehicle 1. Vehicles according to the present invention can also be applied to vehicles other than motorcycles. The vehicle 1 includes a vehicle body 3, a front wheel 4, and a rear wheel 5.

In the following description, front, rear, left, right, up, and down mean front, rear, left, right, up, and down as seen from the driver who rides on the vehicle 1, respectively, unless otherwise specified. In other words, a left-right direction corresponds to a vehicle width direction of the vehicle 1 and a direction in which an axle of a driving wheel in the vehicle 1 extends. A front-back direction corresponds to a front-back direction of the vehicle 1. An up-down direction corresponds to an up-down direction of the vehicle 1.

The vehicle body 3 supports an engine 8 which is a drive source for driving the vehicle 1. The engine 8 functions as a power unit for driving the rear wheel 5 which is the driving wheel, and is configured as a gasoline engine, for example. A driving force generated in the engine 8 is shifted by a transmission (not shown) and transmitted to the rear wheel 5 provided at the rear part of the vehicle body 3. The rear wheel 5 is supported by a swing arm which is swingably provided with respect to a frame body of the vehicle body 3.

In this embodiment, the engine 8 is arranged between the front wheel 4 and the rear wheels 5 in the front-rear direction. More specifically, in this embodiment, the engine 8 is supported by the frame portion in front of the swing arm. The engine 8 is an internal combustion engine. The internal combustion engine generates power by gas expansion that occurs when fuel is burned. The engine 8 is configured to circulate a cooling liquid in order to suppress a temperature rise caused by combustion of fuel. Further, the engine 8 is configured to circulate a lubricating liquid for lubricating a sliding portion such as a rotation supporting portion.

Front forks 11 are attached to a front part of the vehicle body 3. The front forks 11 are arranged in a left-right pair so as to sandwich the front wheel 4 in a front view. The front wheel 4 is rotatably attached to a lower part of each of the front forks 11. The front forks 11 are provided with a front fender 13 serving as a mudguard member that covers the front wheel 4 from above.

A seat 15 on which the driver sits is provided in an upper part of the vehicle body 3. A steering handle 17 operable by the driver is provided on a front upper part of the vehicle body 3. The steering handle 17 is arranged above the front forks 11. Further, a headlight 19 for irradiating a road surface located in front of the vehicle 1 with light is arranged in front of the steering wheel 17.

Figure 2:
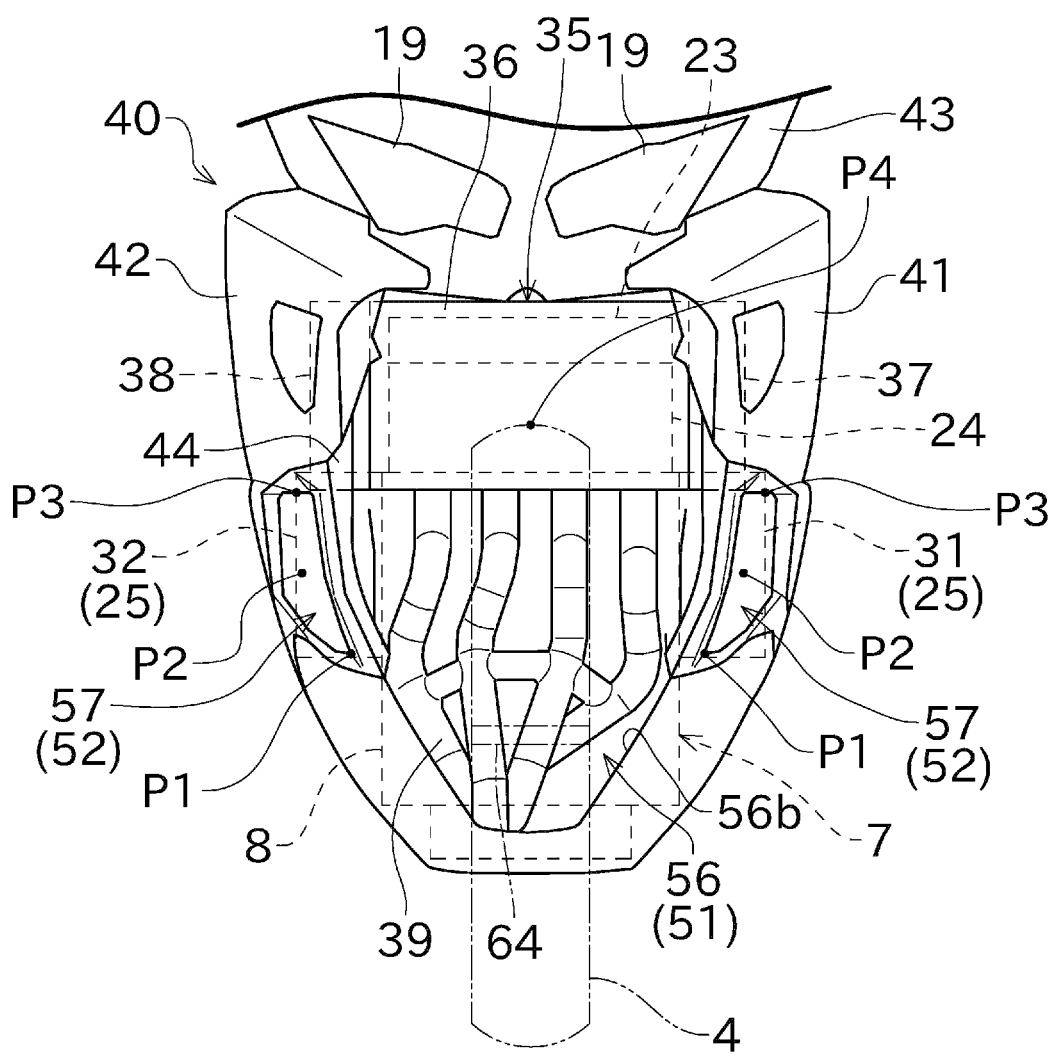
FIG. 2 is a partial front view showing a front part of vehicle.
Figure 3:
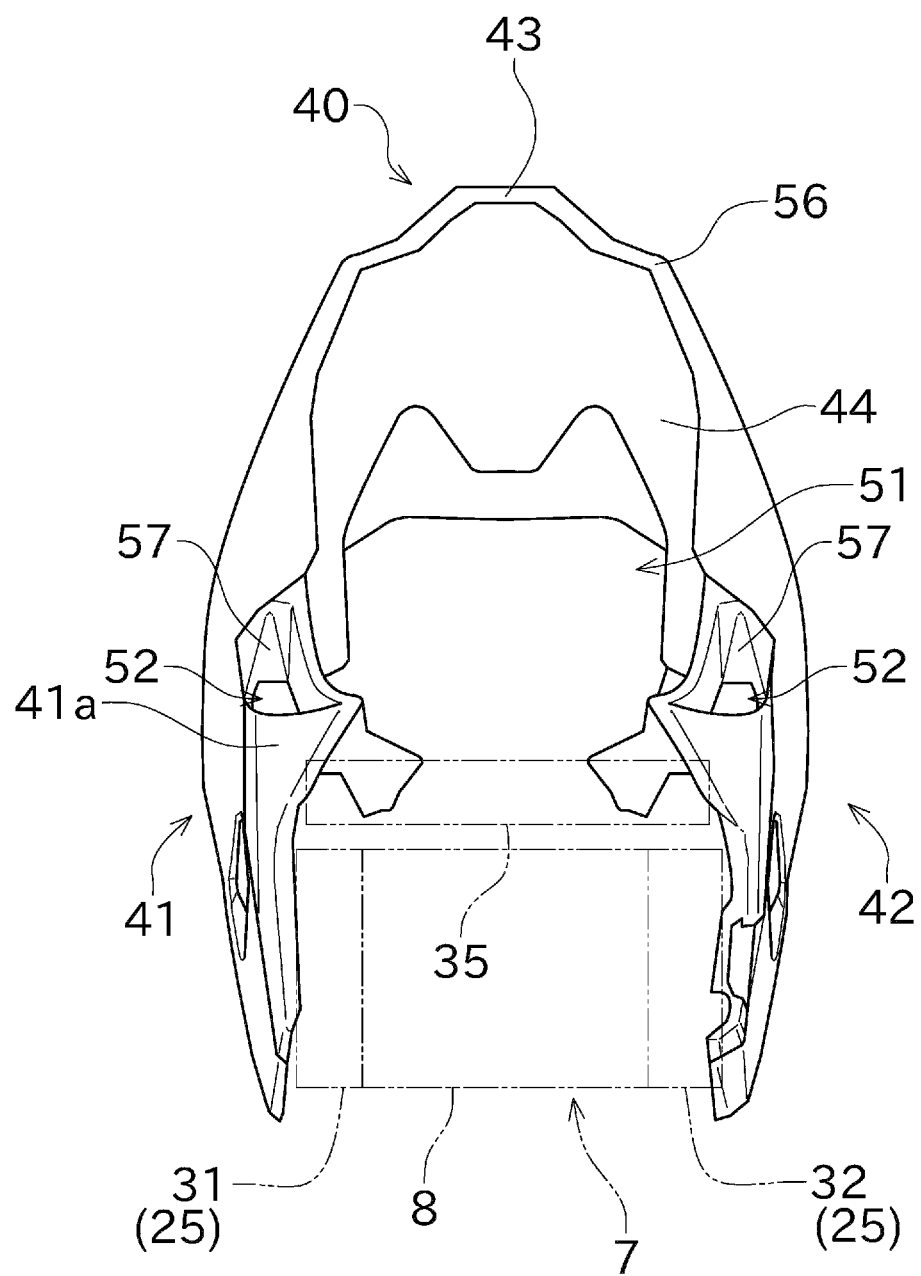
FIG. 3 is a bottom view of a cowl.

Next, the configuration of the front part of the vehicle 1 will be described with reference to FIGS. 1 to 3. FIG. 2 is a partial front view showing the front part of the vehicle 1. FIG. 3 is a bottom view of a front cowl 40 provided in the vehicle 1.

As shown in FIG. 1, a fuel tank 21 that stores fuel to be supplied to the engine 8 is arranged between the seat 15 and the steering handle 17. The engine unit 7 is arranged below the fuel tank 21.

As shown in FIG. 2, the engine 8 includes a cylinder head 23 and a cylinder block 24. The cylinder head 23 constitutes an upper part of the engine 8. The cylinder block 24 is arranged below the cylinder head 23. A cylinder (not shown) is formed inside the cylinder block 24.

Thus, the cylinder head 23 is located in an upper region of the engine 8. The cylinder block 24 is located in a lower region of the engine 8 below the cylinder head 23.

The engine 8 is included in the engine unit 7. In this embodiment, the engine unit 7 includes at least an engine 8, a generator 31, and a clutch 32 that are integrated. The generator 31 generates electric power by the driving force of the engine 8. The clutch 32 switches between a state in which the driving force of the engine 8 is transmitted to the transmission and a state in which the drive force is disengaged.

The generator 31 is arranged on one side of the cylinder head 23 and the cylinder block 24 in the vehicle width direction. The clutch 32 is arranged on the other side of the cylinder head 23 and the cylinder block 24 in the vehicle width direction. The power generated by the engine 8 is transmitted to the generator 31 from one end of a crankshaft of the engine 8 in the vehicle width direction. The generator 31 is arranged adjacent to one side of the cylinder block 24 in the vehicle width direction. The power generated by the engine 8 is transmitted to the clutch 32 via a power transmission mechanism including a gear connected to the other end of the crankshaft in the vehicle width direction. The clutch 32 is arranged behind the cylinder block 24, adjacent to the other side of the cylinder block 24 in the vehicle width direction.

The generator 31 and the clutch 32 are arranged below the cylinder block 24. Further, lubricating liquid, which is an example of circulating liquid stored in the oil pan of the engine 8, is circulated and supplied to the generator 31 and the clutch 32 by a circulation pump for lubricating liquid. The lubricating liquid lubricates the sliding portions of the generator 31 and the clutch 32. The lubricating liquid functions as a cooling liquid which is guided to the heat generating portions of the generator 31 and the clutch 32 and removes heat from the high temperature portions in the generator 31 and the clutch 32. The heat generating portions may be, for example, back surfaces of pistons or the sliding portions in the generator 31 and the clutch 32. After being supplied to the sliding portions and the heat generating portions, the lubricating liquid is guided toward the oil pan by its own weight or a recovery pump. Therefore, below, at least one of the generator 31 and the clutch 32 may be referred to as the lower supplied member 25. The lower supplied member 25 is arranged at least below the cylinder head 23. Further, the lower supplied member may include a storage part in which the lubricating liquid is stored. This storage part is located below the crankshaft of the engine 8. The lower supplied member may be located above the oil pan.

In front of the engine unit 7, a radiator 35 (heat exchanger) for cooling the cylinder head 23 and the cylinder block 24 is arranged. The radiator 35 is located in front of the cylinder head 23 and the cylinder block 24 so as to faces them generally in the front-back direction. The radiator 35 is arranged so as to straddle a center of the vehicle body 3 in the vehicle width direction. That is, the center of the vehicle body 3 in the front-back direction is located between the one end of the radiator 35 in the vehicle width direction and the other end of the radiator 35 in the vehicle width direction. In other words, a center of the radiator 35 in the vehicle width direction may deviate from the center of the vehicle body 3 in the vehicle width direction.

The radiator 35 includes a radiator core 36, an upstream side tank 37, and a downstream side tank 38. The upstream tank 37 is connected to one end of the radiator core 36 in the vehicle width direction. The downstream tank 38 is connected to the other end of the radiator core 36 in the vehicle width direction. The upstream side tank 37 and the downstream side tank 38 are each connected to the engine 8 through pipes.

Since the radiator core 36 has a known structure, detailed description thereof will be omitted. In this embodiment, the radiator core 36 has a plurality of pipes for flowing cooling water in the upstream side tank 37 into the downstream side tank 38. A plurality of cooling fins are provided around the plurality of pipes.

The cooling water is guided from the engine 8 to the plurality of pipes of the radiator core 36 via the upstream side tank 37. When traveling wind hits the cooling fins of the radiator core 36, the heat of the cooling water in the plurality of pipes is removed so that the temperature of the cooling water decreases. The cooling water whose temperature has decreased after passing through the radiator core 36 is sent from the downstream side tank 38 to the engine 8. The cooling water cooled by the radiator 35 is circulated in the engine 8 by a circulation pump for the radiator 35. Specifically, the cooling water is guided to a flow passage formed around one or more cylinders in the cylinder block 24, the cooling water removes the heat from the cylinder head 23 so as to cool the cylinder head 23. Further, the heat is taken from the cylinder head 23 so as to cool the cylinder head 23 by being guided to a flow passage formed around intake and exhaust ports and a spark plug in the cylinder head 23. In this way, the cooling water, which mainly takes heat from the cylinder head 23 and the cylinder block 24 to raise the temperature of the cooling water, is guided to the upstream side tank 37.

A plurality of exhaust pipes 39 corresponding to the number of the cylinders of the engine 8 are provided in a lower part of the vehicle body 3. Each of the exhaust pipes 39 is connected to the engine 8. The exhaust pipes 39 passes below the engine 8 (engine unit 7) and extends rearward. A part of each of the exhaust pipes 39 is provided so as to extend from the upper front part of the engine 8 obliquely downward to the front and then downward.

The plurality of exhaust pipes 39 are joined together at the lower part of the vehicle body 3 (below the radiator 35). The exhaust pipes 39 passes below the engine 8 (engine unit 7)

and extends rearward. Exhaust gas generated in the engine 8 flows through the exhaust pipes 39 and is exhausted from rear ends thereof.

In this embodiment, a front side cowl 40 is provided on the front part of the vehicle body 3. The front side cowl 40 constitutes an outer surface of the front part of the vehicle body 3. The front side cowl 40 is an outer shell member of the vehicle body 3 and includes one or more parts made of a resin material. The front side cowl 40 can hide internal components of the vehicle 1 including a part of the engine 8. The front side cowl 40 is located substantially in front of the seat 15. The front side cowl 40 may be formed by combining a plurality of cowl parts, or may be formed by one part. Further, the front side cowl 40 may be partially integrated with another cowl behind the seat 15. For example, as shown in FIG. 3, the front side cowl 40 includes a left side cowl 41, a right side cowl 42, a front cowl 43, and an inner cowl 44. According to the front side cowl 40, it is possible to suppress uneven portions generated on side surfaces of the vehicle body 3 in the vehicle width direction and smoothly guide the traveling wind flowing along the vehicle body 3 to reduce the traveling resistance. Further, according to the front side cowl 40, it is possible to enhance the windshield effect of suppressing the traveling wind toward the driver by deflecting the traveling wind from the front of to the rear to the outside of the front side cowl 40 in the vehicle width direction.

The left and right side cowls 41, 42 are respectively arranged on front side parts of the vehicle body 3 in the left-right direction. Each of the left and right side cowls 41, 42 has a streamlined shape that bulges outward of the vehicle body 3 in the vehicle width direction as it goes rearward from its front end edge.

The left and right side cowls 41, 42 cover at least a part of a front part of the engine unit 7, respectively. In other words, the left and right side cowls 41, 42 cover at least a front part of the lower supplied member 25, respectively. In this embodiment, the left and right side cowls 41, 42 cover the lower supplied member 25 so as to extend forward from the lower supplied member 25. The left and right side cowls 41, 42 are located substantially in front of the engine unit 7. Specifically, the left and right side cowls 41, 42 is located substantially in front of the radiator 35. In this embodiment, each of the left and right side cowls 41, 42 is composed of a plurality of cowl members. However, the left side cowl 41 and the right side cowl 42 are not limited in terms of their shapes and the number and arrangement of the cowl members constituting them.

The left side cowl 41 is arranged in front of and on a left side of a left side part of the engine unit 7. The right side cowl 42 is arranged in front of and on a right side of a right side part of the engine unit 7. The left side cowl 41 and the right side cowl 42 are arranged below the steering handle 17 and the fuel tank 21, respectively.

The front cowl 43 is arranged at a front end of the vehicle body 3 so as to connect a front part of the left side cowl 41 and a front part of the right side cowl 42. Further, the front cowl 43 is arranged above the front fender 13. The front cowl 43 constitutes a front side part of the vehicle body 3 so as to expose the headlight 19 directed toward a front side of the vehicle body 3.

The inner cowl 44 is arranged inside the left and right side cowls 41, 42 and the front cowl 43. That is, the inner cowl 44 is arranged on a right side of the left side cowl 41, on a left side of the right side cowl 42, and below the front cowl 43. The inner cowl 44 forms a first opening portion 56 which is opened toward the inside of the front side cowl 40 in the front-back direction. The first opening 56 is arranged in front of the radiator 35 so as to face the radiator 35.

As shown in FIG. 2, the inner cowl 44 is formed with a first passage 51 serving as a first flow passage forming portion that defines a space in which a part of the traveling wind flows. The first passage 51 prevents first traveling wind W1 which is the part of the traveling wind flowing from the front toward an inner space of the inner cowl 44 in the vehicle width direction from diverging to the outside of the front side cowl 40 in the vehicle width direction. Thus, the first passage 51 guides the first traveling wind W1 to the radiator 35 arranged inside the front cowl 40 in the vehicle width direction. Specifically, a first guide wall 61, which will be described later, is formed so as to be located in front of the radiator 35 and on both sides of the radiator 35 in the vehicle width direction. Thus, the inner cowl 44 guides the first traveling wind W1 to the radiator 35. The vehicle 1 introduces the first traveling wind W1 into the inside of the front cowl 40 through the first passage 51 so that heat exchange in the radiator 35 is promoted.

Further, each of the left and right side cowls 41, 42 is formed with a second passage 52 serving as a second flow passage forming portion that define space in which another part of the traveling wind flows outside the first traveling wind W1. The second passage 52 prevents second traveling wind W2, which is the other part of the traveling wind flowing outside the inner cowl 44 in the vehicle width direction from the front, from diverging to the outside of the front side cowl 40 in the vehicle width direction. Thus, the second passage 52 guides the second traveling wind W2 to the lower supplied member 25 arranged inside the front cowl 40 in the vehicle width direction. Specifically, a second guide wall 62 (second passage guide wall) and the like, which will be described later, are formed so as to be located in front of the lower supplied member 25 and outside the lower supplied member 25 in the vehicle width direction. Thus, each of the left and right side cowls 41, 42 guides the second traveling wind W2 to the lower supplied portion 25.

Figure 4:
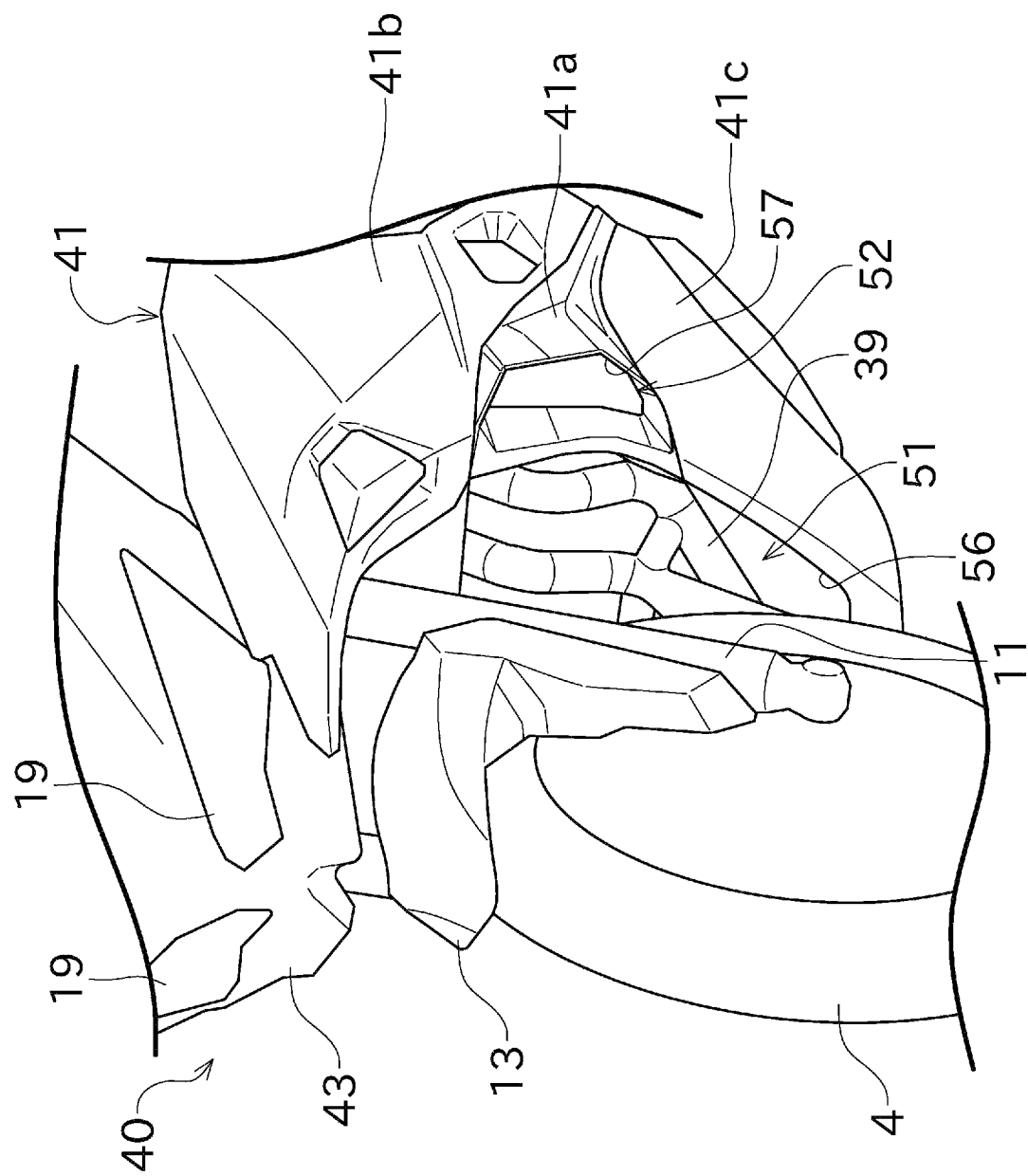
FIG. 4 is a front perspective view showing a first passage and a second passage.
Figure 5:
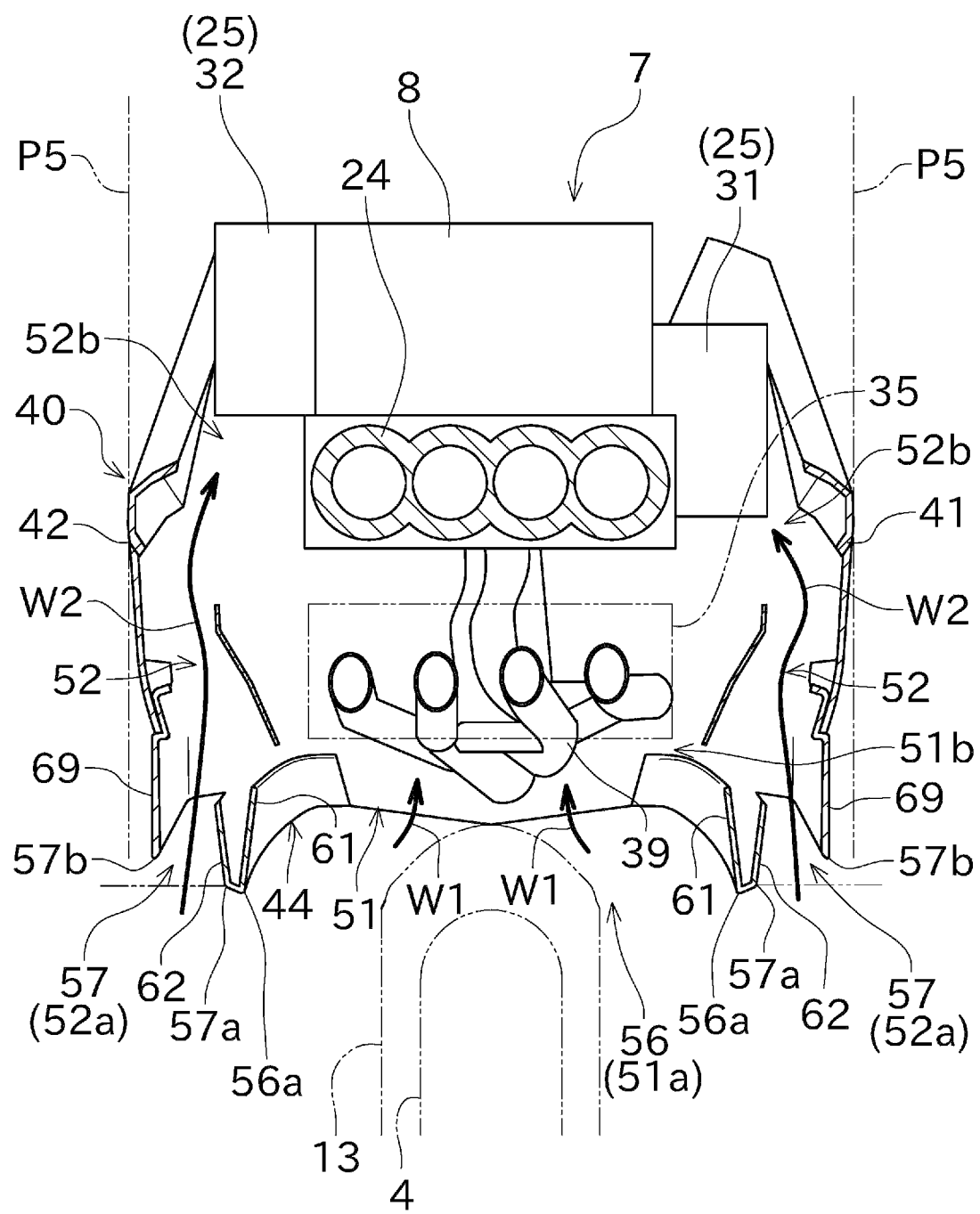
FIG. 5 is a plan cross-sectional view for explaining a flow of traveling wind in each of the first passage and the second passage.
Figure 6:
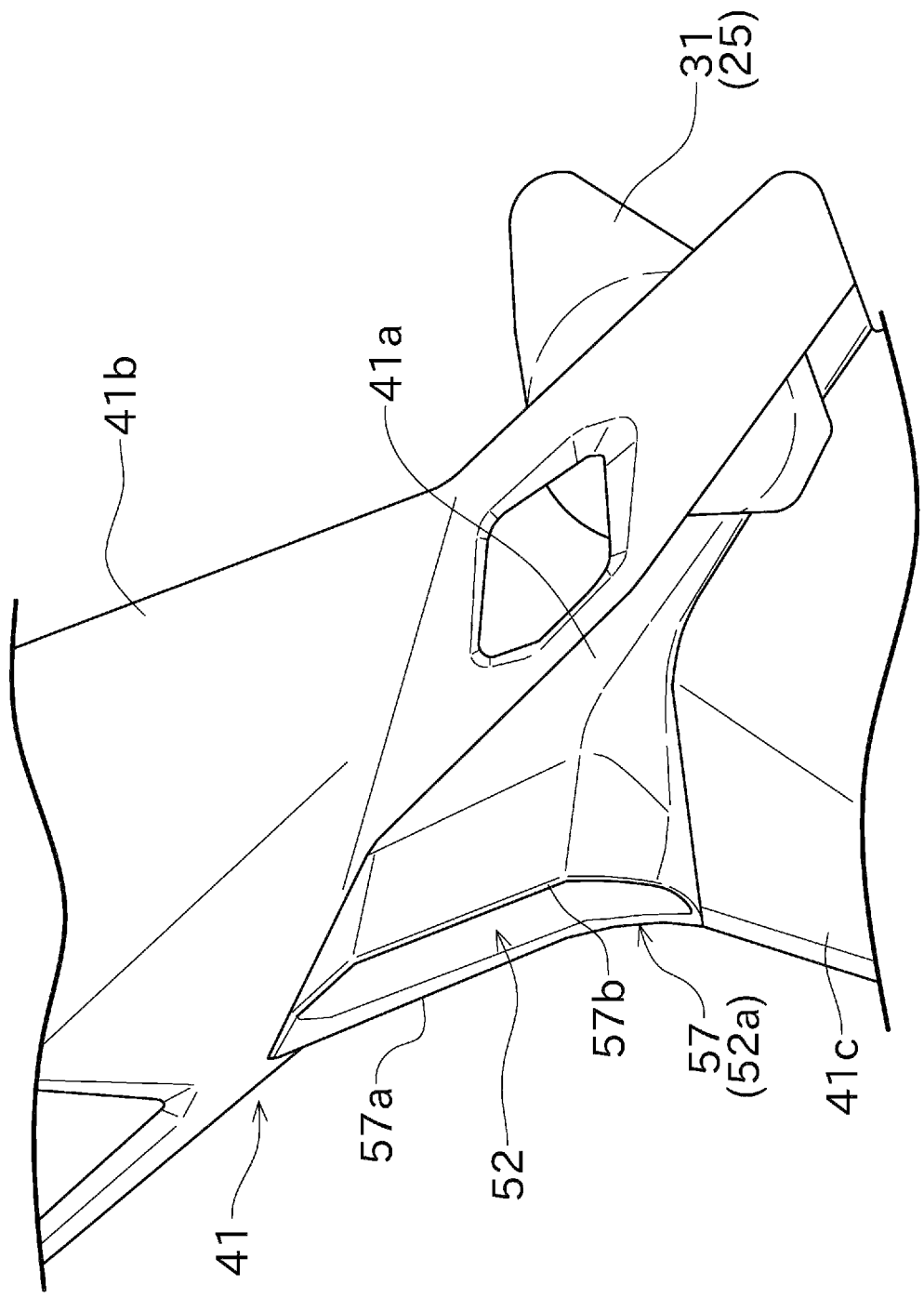
FIG. 6 is a side view showing the second passage.
Figure 7:
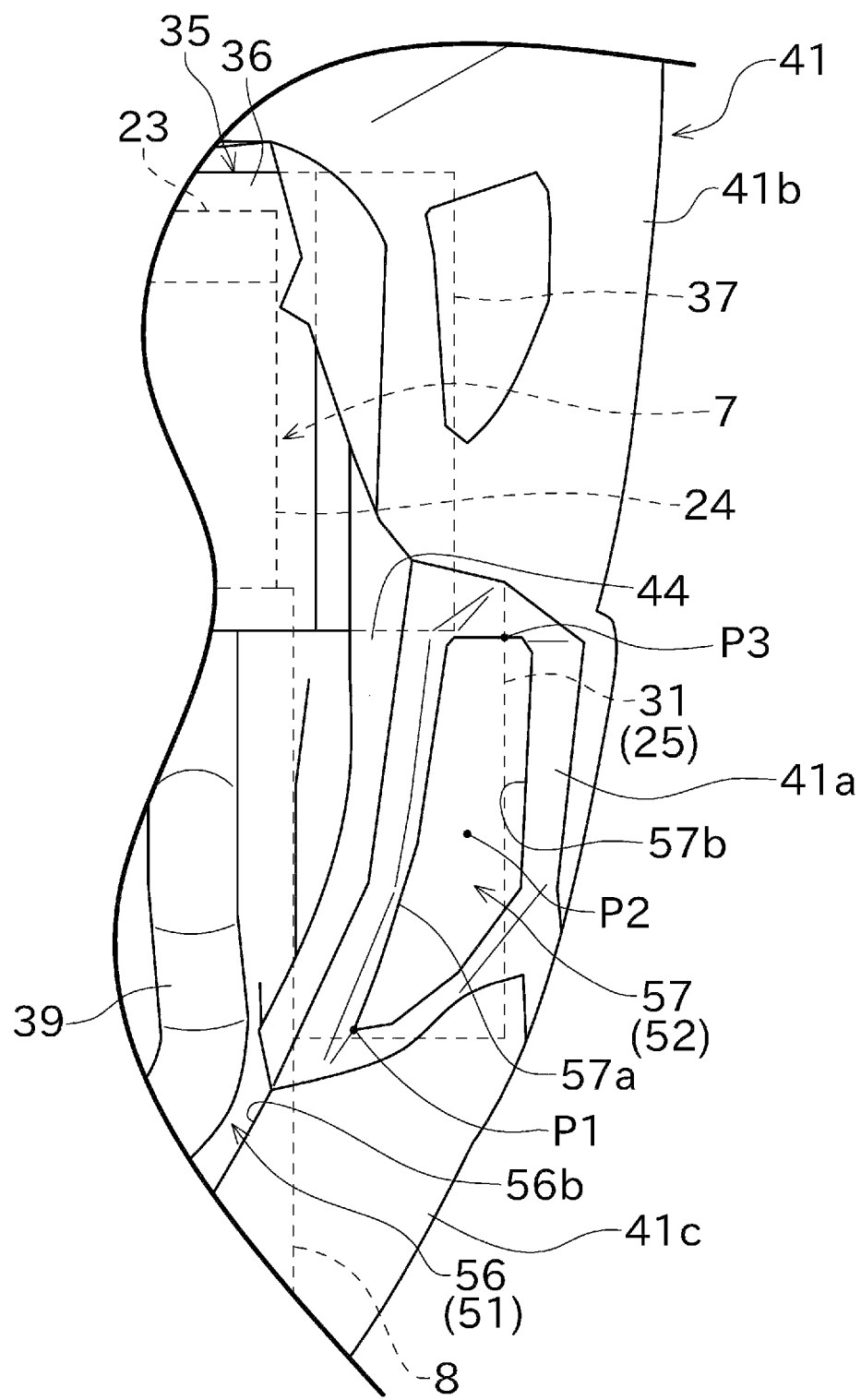
FIG. 7 is a partially enlarged view of FIG. 2.

Next, the relationship between the front cowl 40 and the traveling winds W1, W2 will be described with reference to FIGS. 2 to 7. FIG. 4 is a front perspective view showing the first passage 51 and the second passage 52 of the left side cowl 41. FIG. 5 is a plan cross-sectional view for explaining the flow of the first traveling wind W1 in the first passage 51 and the flow of the second traveling wind W2 in the second passage 52. FIG. 6 is a side view showing the second passage 52. FIG. 7 is a partially enlarged view of FIG. 2

In a vehicle in which an engine is covered by a cowl, the engine may be less likely to be cooled by the traveling wind than in a vehicle in which an engine is exposed. In this embodiment, the vehicle 1 introduces the second traveling wind W2 inside the front cowl 40 through the second passage 52 of each of the left and right side cowls 41, 42 to guide a traveling wind having a relatively low temperature to the lower supplied member 25. As a result, a collision surface of the lower supplied member 25 that collides with the second traveling wind W2 is cooled. Therefore, a temperature rise of the lower supplied member 25 can be suppressed. Further, a temperature rise of the lubricating liquid supplied to the lower supplied member 25 is indirectly prevented. In this way, the temperature rise of the lubricating liquid can be suppressed, and a temperature rise of the engine unit 7 in which the lubricating liquid circulates can be suppressed. By suppressing the temperature rise of the lubricating liquid, it is possible to enhance the effect of cooling the heat generating portion by the lubricating liquid.

It is possible to enhance the cooling effect of the heat-generating part generated by the lubricating liquid.

As shown in FIG. 2, the vehicle 1 includes the first passage 51 and two second passages 52 which are respectively arranged outside the first passage 51 in the vehicle width direction while being partitioned from the first passage 51. In this embodiment, the second passages 52 are arranged on both sides of the first passage 51 in the vehicle width direction, respectively.

The first passage 51 is arranged substantially at the center of the vehicle body 3 in the vehicle width direction. The first passage 51 is arranged in front of the radiator 35.

The first passage 51 has the first opening portion 56 arranged in front of the radiator 35 so as to face the radiator 35. The first opening 56 is arranged at a front end 51a of the first passage 51. As the vehicle 1 travels, air in front of the first opening 56 relatively moves rearward so as to become the first traveling wind W1 and is guided to a rear side of the first passage 51 from the first opening 56. Therefore, the front end 51a corresponds to an inlet portion of the first passage 51. The first passage 51 can allow the first traveling wind W1 taken in from the first opening 56 to flow toward the radiator 35 located behind the first passage 51.

The first opening 56 is formed on a front part of the front side cowl 40 so as to open forward, for example. As shown in FIG. 5, a rear end 51b of the first passage 51 is arranged in front of the radiator 35. The rear end 51b corresponds to an outlet portion of the first passage 51.

The first opening 56 is located substantially in a center of the front side cowl 40 in the vehicle width direction, and is arranged behind the front wheel 4. As shown in FIG. 2, the first opening 56 is arranged so that a gap is formed between the inner cowl 44 and a part of the front wheel 4 (upper part 4 or the like) in the front view.

As shown in FIG. 5, the first passage 51 has the first guide wall (first passage guide wall) 61. The first guide wall 61 guides the first traveling wind W1 introduced from the first opening 56 inward with respect to each of the second passages 52 in the vehicle width direction. The first guide wall 61 defines an outer contour of the front part of the first passage 51 in the vehicle width direction. The first guide wall 61 is provided so as to extend rearward from an edge of the first opening 56. The first guide wall 61 has an inclined shape such that it is located inside the front side cowl 40 in the vehicle width direction as it goes rearward.

In this embodiment, the second passages 52 has left and right second passages 52, each of which functions as the above-described second passage 52. Since the left and right second passages 52 are substantially symmetrical, a configuration of the left second passage 52 will be mainly described below. Hereinafter, the left second passage 52 may be simply referred to as the second passage 52. The second passage 52 is arranged outside the first passage 51 in the vehicle width direction. The second passage 52 is arranged in front of the generator 31 which is the lower supplied member 25. The second passage 52 is mainly composed of the left side cowl 41. The second passage 52 is arranged at an intermediate part of the left side cowl 41 in the up-down direction.

1. The second passage 52 has a second opening 57 provided in a left side cowl 41 serving as a member for covering at least the part of the front part of the engine unit 7. The second opening 57 is arranged at a front end 52a of the second passage 52. As shown in FIG. 5, the second opening 57 is arranged outside the first opening 56 in the vehicle width direction while being partitioned from the first opening 56. Specifically, a partition wall (second guide wall 62) is provided to partition an inner side wall of the inner cowl 44 from the inner side wall of the side cowl 41 in the vehicle width direction. As the vehicle 1 travels, air in front of the second opening 57 moves relatively rearward so as to become the second traveling wind W2 and is guided to a rear side of the second passage 52 from the second opening 57. Therefore, the front end 52a corresponds to an inlet portion of the second passage 52. The second passage 52 can allow the second traveling wind W2 taken in from the second opening 57 to flow toward the lower supplied member 25 (generator 31) located behind the second passage 52.

In this embodiment, as shown in FIGS. 4 and 6, the second passage 52 is mainly configured by an air guide member 41a provided on the left side cowl 41. The air guide member 41a is provided so as to extend in the front-back direction. A front part of the air guide member 41a has a tubular shape having an axis extending in the front-back direction. An upper wall portion 41b is provided above the air guide member 41a. A lower wall portion 41c is provided below the air guide member 41a. The upper wall portion 41b and the lower wall portion 41c are integrally formed and provided on the side cowl 41. The second passage 52 may be formed by combining a plurality of cowl members.

As shown in FIGS. 3 and 4, the second opening 57 is formed at a front end of the left side cowl 41 (air guide member 41a) so as to open toward the front. As shown in FIG. 5, a rear end part 52b of the second passage 52 is arranged in front of the generator 31. The rear end 52b corresponds to an outlet portion of the second passage 52.

A portion of the second opening 57, which is formed as an inner side surface in the vehicle width direction, is inclined so as to be positioned inward in the vehicle width direction as it moves forward. As shown in FIGS. 2 and 7, the second opening 57 is arranged outside the exhaust pipe 39 in the vehicle width direction. The second opening 57 is arranged behind the front wheel 4. An upper end of the second opening 57 is arranged below an upper end of the front wheel 4. An opening area of the second opening 57 is smaller than an opening area of the first opening 56. In the present embodiment, since the left and right second openings 52 are provided, the opening area of the second openings 57 can be increased as a whole.

As shown in FIG. 5, the first guide wall 61 and the second guide wall 62 are arranged in a region serving as a boundary between the first opening 56 and the second opening 57. The second guide wall 62 defines an inner side wall in the vehicle width direction at the front part of the second passage 52. The second guide wall 62 is provided so as to extend rearward from an inner side portion of an edge of the second opening 57 in the vehicle width direction. Hereinafter, this inner side portion may be referred to as an inner edge portion 57a. The second guide wall 62 is inclined so as to be positioned outward in the vehicle width direction as it goes rearward.

The second opening 57 is arranged behind the first opening 56 when viewed in a cross section orthogonal to the up-down direction (vertical direction). Specifically, an outer side portion of the edge of the second opening portion 57 in the vehicle width direction is arranged behind the corresponding portion (edge portion 56a) of the edge of the first opening portion 56. Hereinafter, this outer side portion may be referred to as an outer edge portion 57b.

In this embodiment, as shown in FIGS. 2 and 7, a lower end position P1 of the edge of the second opening 57 is located below a lower end of the radiator 35. The outer edge portion 57b of the second opening 57 is located outside the outer end of the radiator 35 in the vehicle width direction.

Further, a center position P2 of the second opening 57 in the up-down direction is located below the radiator 35. The center position P2 is located below the cylinder formed in the cylinder block 24.

In this embodiment, as shown in FIG. 2, an upper end position P3 of the edge of the second opening 57 is located below an upper end position P4 of the front wheel 4. As shown in FIG. 2, the lower end position P1 is located above an axle 64 of the front wheel 4.

As shown in FIGS. 2 and 7, the edge of the first opening portion 56 has an inclined portion 56b which is inclined inward in the vehicle width direction as it goes downward in a lower part thereof. At least a part of the second opening 57 (specifically, the inner edge portion 57a) is arranged so as to be adjacent to the inclined portion 56b of the first opening 56 in the vehicle width direction. At least the part of the second opening 57 is inclined according to the inclined portion 56b. This makes it easier to secure a space for forming the second opening 57, and the size of the second opening 57 can be increased.

As shown in FIG. 5, the rear end portion 52b of the second passage 52 is provided separately from the rear end portion 51b of the first passage 51. The rear end portion 52b of the second passage 52 is different in position in the vehicle width direction from the rear end portion 51b of the first passage 51. This makes it difficult for the first traveling wind W1 flowing out of the rear end portion 51b of the first passage 51 to be mixed with the traveling wind W2 flowing out of the rear end portion 52b of the second passage 52 inside the front cowl 40.

As shown in FIGS. 4 and 6, the outer edge 57b of the second opening 57 is arranged behind the inner edge 57a. That is, the second opening 57 is formed so as to face diagonally forward of the vehicle body 3. As a result, the opening area of the second opening 57 can be increased as compared with the case where the second opening 57 is formed so as to face forward (front). Further, when the second opening 57 is formed in the air guide member 41a, it is possible to prevent the left side cowl 41 from expanding outward in the vehicle width direction. As described above, the left side cowl 41 has the streamlined shape that bulges outward in the vehicle width direction as it goes rearward. Since the air guide member 41a does not significantly protrude outward in the vehicle width direction with respect to a remaining portion of the left side cowl 41 (the cowl member such as the upper wall portion 41b), the vehicle 1 is good in terms of design, and wind noise generated when the vehicle 1 travels can be reduced. As shown in FIG. 6, the outer edge portion 57b is located behind the inner edge portion 57a. As a result, it is possible to prevent the rigidity of the left side cowl 41 from being lowered due to the formation of the second opening 57.

As shown in FIG. 5, the second passage 52 has an inclined wall 69 that defines an outer side wall of the front part of the second passage 52 in the vehicle width direction. The inclined wall 69 is provided so as to extend in the front-back direction from the outer edge portion 57b of the second opening 57 toward the generator 31. The inclined wall 69 is gently inclined so as to be positioned outward in the vehicle width direction as it goes forward from a rear end of the front part of the second passage 52. Then, the outer edge portion 57b is located inward of the vehicle 1 with respect to the outermost position P5 (position on the chain double-dashed line shown in FIG. 5) on the front projection plane of the vehicle 1 in the vehicle width direction. In other words, the front part of the second passage 52 has an inclined wall 69 that inclines outward in the vehicle width direction as it moves forward from the rear end of the front part of the second passage 52, and is located inside in the vehicle width direction with respect to a rear member behind the inclined wall 69 which is located at the same height as the inclined wall 69.

The outer edge portion 57b does not have to be located outside the outermost position P5 in the vehicle width direction, and may be substantially the same position as the outermost position P5 in the vehicle width direction. Further, since the second opening 57 is arranged so as to incline rearward as it goes downward, the opening area of the second opening 57 can be made to appear small in the front view. In addition, the second opening 57 can be made inconspicuous, and influence on the aesthetics of vehicle 1 can be suppressed.

In the vehicle 1 described above, when the vehicle 1 travels, the air in front of the first opening 56 can be taken into the first passage 51 from the first opening 56 as the first traveling wind W1. The first passage 51 allows the first traveling wind W1 to flow rearward along the first guide wall 61 and the like so as to guide the first traveling wind W1 to the radiator 35. Therefore, the heat exchange in the radiator 35 can be realized by the first traveling wind W1.

Further, when the vehicle 1 travels, the vehicle 1 can take in a part of the air, which is not taken in as the first traveling wind W1 into the first passage 51, into the second passage 52 through the second openings 57 as the second traveling wind W2. The second passage 52 allows the second traveling wind W2 to flow rearward along the second guide wall 62, the inclined wall 69, and the like so as to guide the second traveling wind W2 around the lower supplied member 25 (at least one of the generator 31 and the clutch 32). Therefore, the lower supplied member 25 can be cooled by the second traveling wind W2 different from the first traveling wind W1. As a result, the temperature rise of the lubricating liquid in the lower supplied member 25 can be suppressed.

As described above, the vehicle 1 of this embodiment includes the engine unit 7, the radiator 35, the first passage 51, and the second passages 52. The engine unit includes the cylinder head 23, the cylinder block 24, and the lower supplied member 25. The lower supplied member 25 is provided below the cylinder head 23. The lubricating liquid (circulating liquid) is supplied to the lower supplied member 25. The radiator 35 is arranged in front of the engine unit so as to straddle the center of the vehicle body 3 in a vehicle width direction. The radiator 35 is for cooling the cylinder head 23 of the engine unit 7. The first passage 51 includes the first opening 56 arranged in front of the radiator 35 so as to face the radiator 35, and is configured to guide the first traveling wind W1 from the first opening 56 toward the radiator 35. Each of the second passages includes the second opening 57. The second opening 57 is provided in each of the left side cowl 41 and the right side cowl 42 that covers at least the part the front part of the engine unit 7. The second opening 57 is arranged so as to be partitioned from the first opening 56. In other words, the second opening 57 is arranged outside the first opening 56 in the vehicle width direction with a space in the vehicle width direction from the first opening 56. Each of the second passages 52 is configured to guide the second traveling wind W2 that has deviated from the first opening 56 from the second opening 57 toward the lower supplied member 25.

Thus, the traveling winds W1 and W2 generated when the vehicle 1 travels can be guided to each of the first passage 51 and the second passage 52. Therefore, apart from the first traveling wind W1 flowing through the first passage 51, the second traveling wind W2 flowing through the second passage 52 can be guided toward the lower supplied member 25. Consequently, the cooling of the lower supplied member 25 can be promoted. As a result, the temperature rise of the lubricating liquid (lubricating oil, etc.) in the lower supplied member 25 can be suppressed.

In the vehicle 1 of this embodiment, the lower end position P1 of the edge of the second opening is located below the radiator 35. The outer edge portion 57b of the second opening 57 in the vehicle width direction is located outside the radiator 35 in the vehicle width direction.

Thus, it is possible to cool the lubricating oil in the lower supplied member 25 while suppressing a reduction in the air volume of the first traveling window W1 flowing toward the radiator 35.

In the vehicle 1 of this embodiment, the upper end position P3 of the edge of the second opening 57 is located below the upper end position P4 of the front wheel 4.

Thus, the second traveling wind W2 can be taken in through the second opening 57 at a position close to the lower supplied member 25 in the up-down direction. Therefore, the second traveling wind W2 can be guided to the lower supplied member 25 through the second passage 52 while suppressing a decrease in traveling wind pressure.

In the vehicle 1 of this embodiment, the lower end position P1 of the edge of the second opening 57 is located above the axle 64 of the front wheel 4.

Thus, the traveling wind that has diverted to the outside of the front wheels 4 in the vehicle width direction by the front forks 11 and the like can be taken into the second passage 52 from the second opening 57 as the second traveling wind W2. Therefore, the amount of the second traveling wind W2 flowing through the second passage 52 can be increased.

In the vehicle 1 of this embodiment, the second passage includes a second guide wall 62 for the second passage 52. The second guide wall 62 is inclined so as to be located outside in the vehicle width direction as it goes rearward from the inside (the inner edge portion 57a) in the vehicle width direction at the edge of the second opening 57.

Thus, the second traveling wind W2 flowing through the second passage 52 can be guided outward in the vehicle width direction. Therefore, when the second traveling wind W2 flowing out of the second passage 52 flows toward the lower supplied member 25, the second traveling wind W2 hardly mixes with air warmed by the radiator 35 passing through the first passage 51. As a result, the temperature rise of the second traveling wind W2 can be suppressed.

In the vehicle 1 of this embodiment, the first passage 51 includes a first guide wall for the first passage. The first passage 51 is configured to guide the first traveling wind W1 taken in from the first opening 56 inward in the vehicle width direction. The first guide wall 61 and the second guide wall 62 passage are arranged to face each other in the vehicle width direction.

Thus, the first traveling wind W1 flowing out of the first passage 51 and the second traveling wind W2 flowing out of the second passage 52 can be made more difficult to mix.

In the vehicle 1 of this embodiment, the edge of the second opening 57 is formed such that the outer edge portion 57b is located rearward of the inner edge portion 57a.

Thus, the opening area of the second opening 57 can be increased so that the second traveling wind W2 that can be taken into the second passages 52 through the second opening 57 increases.

In the vehicle 1 of this embodiment, the front part of the second passage 52 includes the inclined wall 69. The inclined wall 69 inclines so that the inclined wall 69 is located outside the vehicle body 3 in the vehicle width direction as it moves forward from the rear end of the front portion of the second passage 52. The inclined wall 69 is located inside the vehicle body 3 in the vehicle width direction than a rear member v 3 located at the same height as the inclined wall 69 and arranged behind the inclined wall 69.

Thus, while suppressing an increase in air resistance that may occur due to the presence of the second passage 52 (due to the air guide member 41a) during the vehicle 1 travels, the second traveling wind W2 taken into the second passage 52 through the second opening 57 can be increased.

Although a preferred embodiment of the present invention has been described above, the configuration described above can be modified, for example, as follows.

The second passage 52 (second opening 57) may be arranged only on one of the left and right sides of the first passage 51 (first opening 56).

The heat exchanger provided in the vehicle 1 is determined according to the vehicle 1. The heat exchanger may have another configuration as long as it has a function of suppressing heat generation of the cylinder head and the cylinder block. For example, when the engine can be sufficiently cooled by the lubricating liquid, the heat exchanger may be an oil cooler or the like that heat-exchanges the lubricating liquid with traveling wind. When the engine included in the engine unit is an air-cooled engine, the heat exchanger may be members having an uneven shape and formed on a cylinder head or a cylinder block of the engine, so-called fins.

The lower supplied member 25 may be only one of the generator 31 and the clutch 32. The lower supplied member 25 may include another device to which the lubricating oil is supplied. Further, in this embodiment, the description has been given using the motorcycle as the vehicle. However, the present invention can be similarly applied to a vehicle including three or more wheels. The present invention can be more suitably applied to a vehicle such as a straddle-type vehicle that has a relatively small dimension in the vehicle width direction and in which it is difficult to increase the size of a heat exchanger in the vehicle. Further, when an engine having a large number of cylinders such as three or four cylinders or a small displacement per cylinder is applied to a vehicle, the engine rotates at a relatively high speed. Therefore, the temperature of the engine easily rises. In this case, the present invention can be more suitably applied to the vehicle. For example, the present invention can be more preferably applied to a vehicle having four-cylinder 400 cc engine. In a full-cowl type, that is, in a vehicle in which most of the side portions of a vehicle body in the vehicle width direction, for example, 80% or more of the side portions are covered with the cowl, the cooling effect due to traveling wind is low. Therefore, the present invention can be preferably used for this vehicle.

Obviously, numerous modifications and variations of the present invention are possible in light of the above teachings. It is therefore to be understood that within the scope of the appended claims, the invention may be practiced otherwise than as specifically described herein.

What is claimed is:
1. A vehicle, comprising:
an engine unit including a cylinder head, a cylinder block, and a lower supplied member which is provided below the cylinder head and to which circulating liquid is supplied;

a heat exchanger for cooling the cylinder head of the engine unit, which is arranged in front of the engine unit so as to straddle a center of a vehicle body in a vehicle width direction;

a first passage including a first opening arranged in front of the heat exchanger so as to face the heat exchanger, and configured to guide a part of traveling wind from the first opening toward the heat exchanger; and a second passage including a second opening provided in a covering member arranged outside the first opening in the vehicle width to cover at least a part of a front part of the engine unit while being partitioned from the first opening, and configured to guide another part of traveling wind from the second opening toward the lower supplied member.

2. The vehicle according to claim 1, wherein a lower end position of an edge part of the second opening is located below the heat exchanger and wherein an outer edge part of the second opening in the vehicle width direction is located outside the heat exchanger in the vehicle width direction.

3. The vehicle according to claim 1, wherein an upper end position of an edge part of the second opening is located below an upper end position of a front wheel on the vehicle.

4. The vehicle according to claim 1, wherein the lower end position of the edge part of the second opening is located above an axle of the front wheel on the vehicle.

5. The vehicle according to claim 1, wherein the second passage includes:

a second guide wall for the second passage which is inclined so as to be located outside in the vehicle width direction as it goes rearward from the inside in the vehicle width direction at the edge of the second opening.

6. The vehicle according to claim 5, wherein the first passage includes:

a first guide wall for the first passage configured to guide the traveling wind taken in from the first opening inward in the vehicle width direction and wherein the first guide wall and the second guide wall are arranged to face each other in the vehicle width direction.

7. The vehicle according to claim 1, wherein the edge part of the second opening is formed such that the outer edge portion in the vehicle width direction is located rearward of an inner edge portion in the vehicle width direction.

8. The vehicle according to claim 1, wherein the front part of the second passage includes:

an inclined wall that inclines so that the inclined wall is located outside the vehicle body in the vehicle width direction as it moves forward from a rear end of the front part of the second passage and wherein the inclined wall is located inside the vehicle body in the vehicle width direction than a rear member of the vehicle body located at the same height as the inclined wall and arranged behind the inclined wall.

* * * * *